(12) United States Patent
Diachina et al.

(10) Patent No.: US 9,999,089 B2
(45) Date of Patent: Jun. 12, 2018

(54) FRAME NUMBER EXTENSION FOR LONG DISCONTINUOUS RECEIVE (DRX) CYCLES

(71) Applicant: TELEFONAKTIEBOLAGET L M ERICSSON (PUBL), Stockholm (SE)

(72) Inventors: John Walter Diachina, Garner, NC (US); Mårten Sundberg, Årsta (SE); Olof Liberg, Stockholm (SE); Ravitej Ballakur, Bangalore (IN); Nicklas Johansson, Brokind (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 157 days.

(21) Appl. No.: 14/875,466

(22) Filed: Oct. 5, 2015

(65) Prior Publication Data

US 2016/0105926 A1 Apr. 14, 2016

Related U.S. Application Data

(60) Provisional application No. 62/082,467, filed on Nov. 20, 2014.

(30) Foreign Application Priority Data

Oct. 9, 2014 (IN) ............................ 2887/DEL/2014

(51) Int. Cl.
*H04W 76/04* (2009.01)
*H04J 3/16* (2006.01)
*H04W 4/00* (2018.01)

(52) U.S. Cl.
CPC ......... *H04W 76/048* (2013.01); *H04J 3/1694* (2013.01); *H04W 4/005* (2013.01)

(58) Field of Classification Search
None
See application file for complete search history.

(56) References Cited

U.S. PATENT DOCUMENTS

| 2007/0291731 | A1* | 12/2007 | Lee ..................... G04R 20/14 370/350 |
| 2011/0195709 | A1 | 8/2011 | Christensson et al. |
| 2015/0215989 | A1* | 7/2015 | Bangolae .......... H04W 52/0251 370/311 |

FOREIGN PATENT DOCUMENTS

| EP | 1868050 A2 | 12/2007 |
| WO | 2011/087233 A2 | 7/2011 |
| WO | 2014/113074 A1 | 7/2014 |

OTHER PUBLICATIONS

Nokia Networks: "Narrow Band Hybrid Modulation for Cellular IoT," 3GPP Draft; GP-140583; 3rd Generation Partnership Project; Ljubljana, Slovenia; Aug. 24, 2014.*
3rd Generation Partnership Project; 3GPP TSG GERAN#63, Tdoc GP-140605, GSM Evolution for cellular IoT—PCH overview; Ljubljana, Slovenia, Aug. 25-29, 2014, Ericsson.*

(Continued)

*Primary Examiner* — Christopher Crutchfield
*Assistant Examiner* — Thinh Tran

(57) ABSTRACT

A wireless device (e.g., Machine Type Communications (MTC) device), a radio access network node (e.g., evolved Node B), and various methods are described herein for implementing long paging cycles (i.e., long discontinuous receive (DRX) cycles) within a wireless communication network.

20 Claims, 3 Drawing Sheets

(56) References Cited

OTHER PUBLICATIONS

Samsung: "Introduction of long SFN length for MTC," 3GPP Draft; R2-100331; 3rd Generation Partnership Project; Valencia, Spain; Jan. 12, 2010.
Ericsson: "GSM optimization for Internet of Things," 3GPP Draft; GP-140297; 3rd Generation Partnership Project; Valencia, Spain; May 26, 2014.
$3^{rd}$ Generation Partnership Project; Technical Specification Group GSM/EDGE Radio Access Network; Multiplexing and multiple access on the radio path (Release 12), 3GPP TS 45.002 V.12.1.0 (Nov. 2013).
$3^{rd}$ Generation Partnership Project; 3GPP TSG GERAN#63, Tdoc GP-140605, GSM Evolution for cellular IoT—PCH overview; Ljubljana, Slovenia, Aug. 25-29, 2014, Ericsson.
$3^{rd}$ Generation Partnership Project; Technical Specification Group Core Network and Terminals; Mobile radio interface Layer 3 specification; Core network protocols; Stage 3 (Release 12), 3GPP TS 24.008 V.12.7.0 (Sep. 2014).
U.S. Appl. No. 62/023,453, filed Jul. 11, 2014, Eriksson Löwenmark et al.

* cited by examiner

FRAME NUMBER EXTENSION FOR LONG DISCONTINUOUS RECEIVE (DRX) CYCLES

CLAIM OF PRIORITY

This application claims the benefit of priority to Indian Application No. 2887/DEL/2014, filed on Oct. 9, 2014, and to U.S. Provisional Application Ser. No. 62/082,467, filed on Nov. 20, 2014, the entire contents of each are hereby incorporated by reference for all purposes.

TECHNICAL FIELD

The present disclosure relates generally to a wireless communication network and, more particularly, to a wireless device (e.g., Machine Type Communications (MTC) device), a radio access network node (e.g., evolved Node B), and various methods for implementing long paging cycles (e.g., long discontinuous receive (DRX) cycles) within the wireless communication network.

BACKGROUND

The following abbreviations and terms are herewith defined, at least some of which are referred to within the following description of the present disclosure.
3 GPP 3rd-Generation Partnership Project
AGCH Access Grant Channel
ASIC Application Specific Integrated Circuit
BLER Block Error Rate
BS Base Station
BSS Base Station Subsystem
CC Coverage Class
CCCH Common Control Channel
CDMA Code Division Multiple Access
CRC Cyclic Redundancy Check
DRX Discontinuous Receive Cycle
DSP Digital Signal Processor
EDGE Enhanced Data rates for GSM Evolution
EGPRS Enhanced General Packet Radio Service
FCCH Frequency Correction Channel
FN Frame Number
GSM Global System for Mobile Communications
GERAN GSM/EDGE Radio Access Network
GPRS General Packet Radio Service
HARQ Hybrid Automatic Repeat Request
IE Information Element
IMSI International Mobile Subscriber Identity
IoT Internet of Things
LTE Long-Term Evolution
MS Mobile Station
MTC Machine Type Communications
NAS Non-Access Stratum
PCH Paging Channel
PDN Packet Data Network
RACH Random Access Channel
RAN Radio Access Network
RFN Reduced TDMA Frame Number
RRC Radio Resources Control
SCH Synchronization Channel
SGSN Serving GPRS Support Node
SI System Information
TDMA Time Division Multiple Access
TSG Technical Specifications Group
UE User Equipment
WCDMA Wideband Code Division Multiple Access
WiMAX Worldwide Interoperability for Microwave Access
Coverage Class: At any point in time a device belongs to a specific uplink/downlink coverage class which determines the total number of blind transmissions to be used when transmitting/receiving radio blocks. An uplink/downlink coverage class applicable at any point in time can differ between different logical channels. Upon initiating a system access a device determines the uplink/downlink coverage class applicable to the RACH/AGCH based on estimating the number of blind repetitions of a radio block needed by the BSS receiver/device receiver to experience a BLER (block error rate) of approximately 10%. The BSS determines the uplink/downlink coverage class to be used by a device on the device's assigned packet channel resources based on estimating the number of blind repetitions of a radio block needed to satisfy a target BLER and considering the number of HARQ retransmissions (of a radio block) that will, on average, result from using that target BLER.

DRX cycle: Discontinuous reception (DRX) is a process of a wireless device disabling its ability to receive when it does not expect to receive incoming messages and enabling its ability to receive during a period of reachability when it anticipates the possibility of message reception. For DRX to operate, the network coordinates with the wireless device regarding when instances of reachability are to occur. The wireless device will therefore wake-up and enable message reception only during pre-scheduled periods of reachability. This process reduces the power consumption which extends the battery life of the wireless device and is sometimes called sleep mode.

Extended Coverage: The general principle of extended coverage is that of using blind repetitions for the control channels and for the data channels. In addition, for the data channels the use of blind repetitions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind repetitions are associated with each of the coverage classes wherein extended coverage is associated with coverage classes for which multiple blind repetitions are needed (i.e., a single blind repetition is considered as the reference coverage). The number of total blind transmissions for a given coverage class can differ between different logical channels.

Internet of Things (IoT) devices: The Internet of Things (IoT) is the network of physical objects or "things" embedded with electronics, software, sensors, and connectivity to enable objects to exchange data with the manufacturer, operator and/or other connected devices based on the infrastructure of the International Telecommunication Union's Global Standards Initiative. The Internet of Things allows objects to be sensed and controlled remotely across existing network infrastructure creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Experts estimate that the IoT will consist of almost 50 billion objects by 2020.

As described in 3GPP TSG-GERAN Meeting #63 Tdoc GP-140605, entitled "GSM Evolution for cellular IoT-PCH Overview" (the contents of which are incorporated herein by reference), wireless devices (e.g., those used for machine type communications (MTC)) can operate using different coverage classes and can be expected to make use of different discontinuous receive (DRX) cycles ranging from minutes to hours or even days depending on the frequency of reachability desired for such wireless devices. As such, these wireless devices can transmit information to the radio access network (RAN) regarding their desired DRX cycle length within Radio Resources Control (RRC) or Non-Access Stratum (NAS) messages (e.g., GPRS Attach or Routing Area Update messages), thereby allowing the RAN or the Core Network (e.g., SGSN) to determine the periodicity with which the wireless devices will wake-up to look for a page according to their nominal paging group associated within their desired DRX cycle. The total number of paging groups per DRX cycle can be determined based on coverage class, since each coverage class will need a different number of Paging Channel (PCH) block repetitions within the context of a single paging group. For example, considering a wireless communication network wherein a single 51-multiframe supports 8 PCH blocks, it can be the case where the desired DRX cycle Y=256 51-multiframes≈60 seconds (e.g., exactly 208 of these DRX cycles will occur within the overall TDMA Frame Number (FN) space of 2715648 TDMA frames). Accordingly, the number of paging groups supported within DRX cycle Y can be determined by the coverage class of a wireless device that operates using that DRX cycle as follows:

PCH blocks per DRX cycle=PB_DRX_CYCLE=256× 8=2048.
Coverage Class 1: Paging groups per DRX cycle Y=PB_DRX_CYCLE=2048
Coverage Class 2: Paging groups per DRX cycle Y=PB_DRX_CYCLE div 2=1024
Coverage Class 3: Paging groups per DRX cycle Y=PB_DRX_CYCLE div 4=512
Coverage Class 4: Paging groups per DRX cycle Y=PB_DRX_CYCLE div 8=256
Coverage Class 5: Paging groups per DRX cycle Y=PB_DRX_CYCLE div 16=128

In the interest of extreme power savings, wireless devices may benefit from DRX cycles longer than the longest time reference currently available within the Global System for Mobile (GSM) frame structure. In this regard, the existing TDMA FN space supports values ranging from 0 to 2715647, which spans a time interval of 208 minutes and 53.76 seconds (i.e., the hyperframe length) and will therefore be inadequate for supporting DRX cycles that are longer than this time interval. For example, if a wireless device has a DRX cycle of three times the hyperframe length (i.e., ≈10 hours, 26 minutes, and 41 seconds), then both the radio access network node (network) and the wireless device would need to agree on which hyperframe the nominal paging group occurs in order for the radio access network node (network) to know when to page the wireless device and for the wireless device to know when to listen for the page on the PCH. This does not exist today. Hence, a solution to this need and other needs is provided in the present disclosure.

SUMMARY

A wireless device, a radio access network node, and various methods for addressing at least the aforementioned need are described in the independent claims. Advantageous embodiments of the wireless device, the radio access network node, and the various methods are further described in the dependent claims.

In one aspect, the present disclosure provides a wireless device configured to interact with a radio access network node. The wireless device comprises a processor and a memory that stores processor-executable instructions, wherein the processor interfaces with the memory to execute the processor-executable instructions, whereby the wireless device is operable to perform a receiving operation. In the receiving operation, the wireless device receives, from the radio access network node, FN Extension information which indicates a multiplication factor for multiplying a time period spanned by a full cycle of TDMA frame numbers which comprises a single hyperframe. The wireless device uses the FN Extension information to implement long paging cycles (e.g., long DRX cycles) within the wireless communication network which in turn enables power savings to be realized by the wireless device.

In another aspect, the present disclosure provides a method in a wireless device configured to interact with a radio access network node. The method comprises a receiving step. In the receiving step, the wireless device receives, from the radio access network node, FN Extension information which indicates a multiplication factor for multiplying a time period spanned by a full cycle of TDMA frame numbers which comprises a single hyperframe. The wireless device uses the FN Extension information to implement long paging cycles (e.g., long DRX cycles) within the wireless communication network which in turn enables power savings to be realized by the wireless device.

In yet another aspect, the present disclosure provides a radio access network node configured to interact with a wireless device. The radio access network node comprises a processor and a memory that stores processor-executable instructions, wherein the processor interfaces with the memory to execute the processor-executable instructions, whereby the radio access network node is operable to perform a transmit operation. In the transmit operation, the radio access network node transmits, to the wireless device, FN Extension information which indicates a multiplication factor for multiplying a time period spanned by a full cycle of TDMA frame numbers which comprises a single hyperframe. The radio access network node uses the FN Extension information to implement long paging cycles (e.g., long DRX cycles) with the wireless device which enables power savings to be realized by the wireless device.

In still yet another aspect, the present disclosure provides a method in a radio access network node configured to interact with a wireless device. The method comprises a transmitting step. In the transmitting step, the radio access network node transmits, to the wireless device, FN Extension information which indicates a multiplication factor for multiplying a time period spanned by a full cycle of TDMA frame numbers which comprises a single hyperframe. The radio access network node uses the FN Extension information to implement long paging cycles (e.g., long DRX cycles) with the wireless device which enables power savings to be realized by the wireless device.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
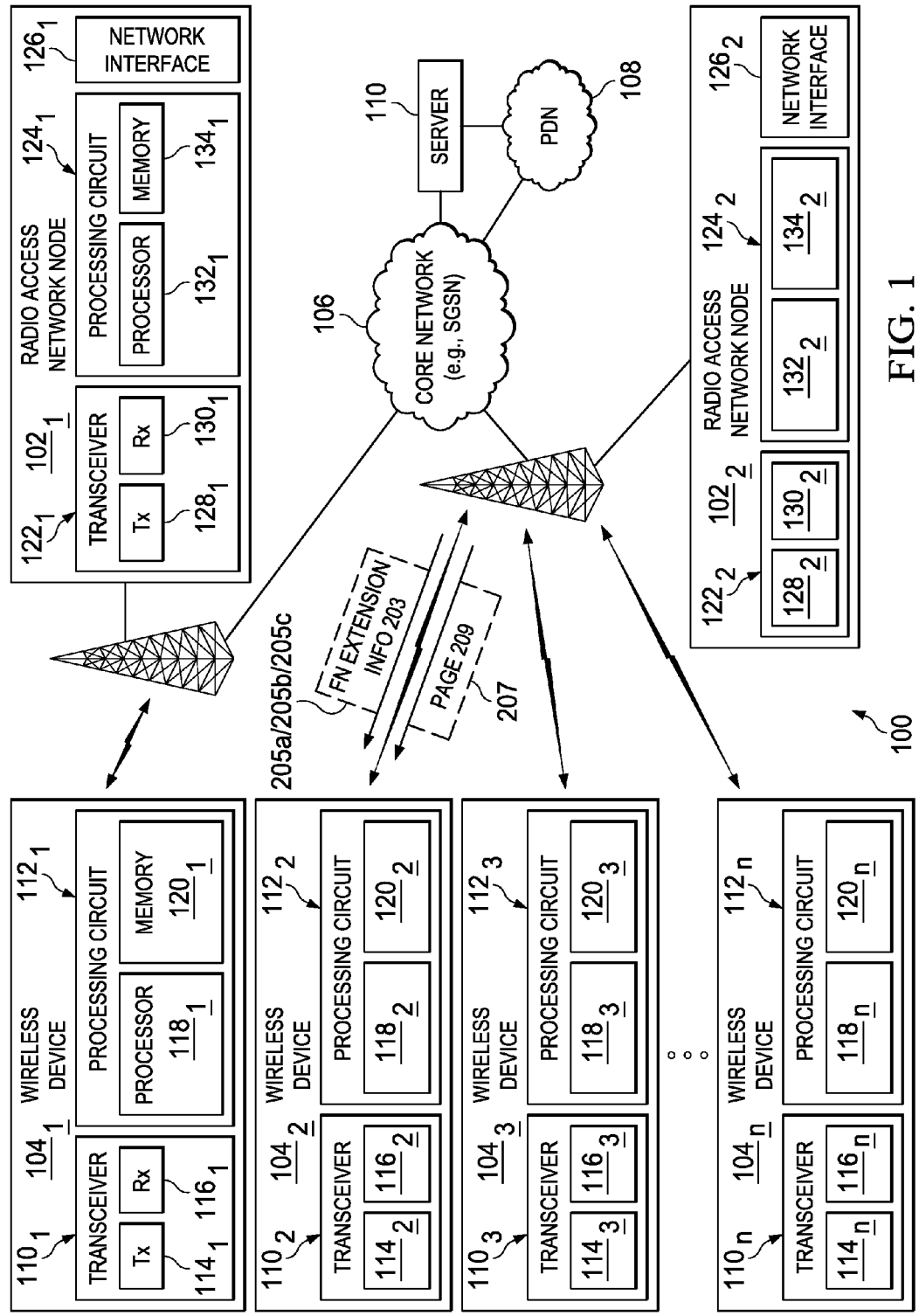
FIG. 1 is a diagram of an exemplary wireless communication network which includes multiple wireless devices (e.g., MTC devices, IoT devices) and multiple wireless access nodes (e.g., evolved NodeBs, base stations) all of which are configured in accordance with an embodiment of the present disclosure.

To describe the technical features of the present disclosure, a discussion is provided first to describe an exemplary wireless communication network which includes multiple wireless devices (e.g., MTC devices, IoT devices) and multiple radio access network nodes (e.g., base stations, eNodeBs) all of which are configured in accordance with the present disclosure (illustrated in FIG. 1). Then, a discussion is provided to explain a Frame Number (FN) Extension field (i.e., FN Extension information) which is a feature of the present disclosure. Thereafter, a discussion is provided to explain the basic functionalities-configurations of the wireless devices (e.g., MTC devices, IoT devices) and the radio access network nodes (e.g., base stations, eNodeBs) and how the FN Extension information is utilized in accordance with the present disclosure (illustrated in FIGS. 2-5). Finally, a discussion is provided to explain an exemplary scenario on how a wireless device uses the FN Extension information when negotiating a DRX cycle with the network and determining its nominal paging group in accordance with the present disclosure.

Exemplary Wireless Communication Network 100

Referring to FIG. 1, there is illustrated an exemplary wireless communication network 100 in accordance with the present disclosure. The wireless communication network 100 includes multiple radio access network nodes $102_1$ and $102_2$ (only two shown), multiple wireless devices $104_1$, $104_2$, $104_3$ ... $104_n$, and a core network 106 (e.g., EGPRS core network 106). The wireless communication network 100 also includes many other well-known components, but for clarity, only the components needed to describe the features of the present disclosure are described herein. Further, the wireless communication network 100 is described herein as being an GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the radio access network nodes $102_1$ and $102_2$ (only two shown) which provide network access to the wireless devices $104_1$, $104_2$, $104_3$ ... $104_n$. In this example, the radio access network node $102_1$ is providing network access to wireless device $104_1$ while the radio access network node $102_2$ is providing network access to wireless devices $104_2$, $104_3$ ... $104_n$. The radio access network nodes $102_1$ and $102_2$ are connected to the core network 106 (e.g., EGPRS core network 106). The core network 106 is connected to an external packet data network (PDN) 108, such as the Internet, and a server 110 (only one shown). The wireless devices $104_1$, $104_2$, $104_3$ ... $104_n$ may communicate with one or more servers 110 (only one shown) connected to the core network 106 or the PDN 108.

The wireless devices $104_1$, $104_2$, $104_3$ ... $104_n$ may refer generally to an end terminal (user) that attaches to the wireless communication network 100, and may refer to either an IoT device or MTC device (e.g., smart meter) or a non-MTC device. Thus, the term may be synonymous with the term mobile device, mobile station (MS), "User Equipment" or UE, as that term is used by the 3rd-Generation Partnership Project (3GPP), and includes standalone wireless devices, such as terminals, cell phones, tablets, smart phones, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the terms "radio access network node $102_1$ and $102_2$" and "RAN node" are used herein in their most general sense to refer to wireless access nodes such as a base station or wireless access point in a wireless communication network, and may refer to wireless access nodes that are controlled by a physically distinct radio network controller as well as to more autonomous access points, such as the so-called evolved Node Bs (eNodeBs) in LTE networks.

Each wireless device $104_1$, $104_2$, $104_3$ ... $104_n$ may include a transceiver circuit $110_1$, $110_2$, $110_3$ ... $110_n$ for communicating with the radio access network nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding wireless device $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard. The processing circuit $112_1$, $112_2$, $112_3$ ... $112_n$ may include a processor $118_1$, $118_2$, $118_3$ ... $118_n$ and a memory $120_1$, $120_2$, $120_3$ ... $120_n$ for storing program code for controlling the operation of the corresponding wireless device $104_1$, $104_2$, $104_3$ ... $104_n$. The program code may include code for performing the procedures (e.g., implementing paging cycles in a cellular network, transmitting an indication of a long DRX mode, performing a synchronizing procedure and attempting to read a radio block received per a long DRX mode, tracking instances of legacy TDMA FN values, incrementing a counter, determining that a timeslot includes an SCH burst, determining a current frame in a 51-multiframe within an extended FN space based on a field value) as described hereinafter.

Each radio access network node $102_1$ and $102_2$ may include a transceiver circuit $122_1$ and $122_2$ for communicating with wireless devices $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding radio access network node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$ and a memory $134_1$ and $134_2$ for storing program code for controlling the operation of the corresponding radio access network node $102_1$ and $102_2$. The program code may include code for performing the procedures (e.g., receiving an indication of a long DRX mode, transmitting a radio block according to a long DRX mode) as described hereinafter.

FN Extension Field (FN Extension Information)

A solution that allows wireless devices $104_1$, $104_2$, $104_3$ . . . $104_n$ to track successive instances of the legacy TDMA FN values cycling through their full range can effectively be realized by introducing an FN Extension field. This FN Extension field could serve as a counter to indicate how many times the legacy TDMA FN values have cycled through their complete range, starting from time t=Ts. For example, if a new 5-bit field, e.g., called "FN Extension," is introduced, then the field can be used to indicate which of up to $2^5$=32 instances that the legacy TDMA FN values are currently cycling through as follows:

- Time t=Ts applies to a TDMA frame for which the FN Extension=0 and the TDMA FN=0.
- As the TDMA FN values increment through their first full cycle (i.e., TDMA frames numbered from 0 to 2715647) starting at t=Ts, the value of the FN Extension counter remains 0.
- As the second full cycle of TDMA FN values starts (i.e., starting with the TDMA frame immediately following the TDMA frame for which the TDMA FN=2715647), the value of the FN Extension counter is incremented and therefore has a value of 1 during the entire second full cycle of TDMA FN values.
- Similarly, as the third full cycle of TDMA FN values starts, the value of the FN Extension counter is incremented and therefore has a value of 2 during the entire third full cycle of TDMA FN values.
- During the thirty-second full cycle of TDMA FN values, the FN Extension counter has a value of 31. When this thirty-second full cycle is complete, both the TDMA FN value and the FN Extension counter value both cycle back to 0 (i.e., in the TDMA frame immediately following the TDMA frame for which the TDMA FN value=2715647 and the FN Extension value=31). Then this entire process repeats itself.

According to this example, the total time spanned by 32 cycles of the legacy TDMA FN values=32×(208 minutes and 53.76 seconds) or about 111.4 hours, which means long DRX cycles up to about 111.4 hours long can be supported. Hence, the "FN Extension" field can be seen as a multiplication factor used to multiply the time period spanned by a full cycle of the legacy TDMA FN values. Long DRX cycles that are even greater than 111.4 hours can be realized, for example, by introducing an "FN Extension" field that is longer than 5 bits.

Further, the different wireless devices $104_1$, $104_2$, $104_3$ . . . $104_n$ can indicate a desire for different Long DRX cycle lengths, e.g., using NAS signaling such as registrations. For example, U.S. Patent Publication No. 2011-0195709, published Aug. 11, 2011, and entitled "Method and Arrangement in a Telecommunication System" discusses how wireless devices can indicate their preferred DRX cycle length within the context of the time period spanned by the legacy TDMA FN values. The contents of this document are incorporated herein by reference.

Exemplary solutions for introducing a FN Extension field include the following:

Solution 1

A new N-bit field can be introduced as a new FN Extension field within a legacy System Information (SI) message, as part of a new SI message, or by re-casting a legacy Information Element (IE) to serve a new purpose (e.g., due to a legacy IE not being currently used in practice), wherein the value of N reflects the factor by which the time spanned by a single full cycle of the legacy TDMA FN space is to be multiplied. In other words, the new N-bit field can comprise a 5-bit counter, for example, that allows the wireless device $104_1$, $104_2$, $104_3$ . . . $104_n$ to determine in which of 32 possible instances of a hyperframe (i.e., which of 32 possible repetitions of the legacy TDMA FN space) that any given TDMA frame occurs. More specifically, the new FN Extension field will allow the wireless device $104_1$, $104_2$, $104_3$ . . . $104_n$ to determine the precise location of any given TDMA frame within a set of TDMA frames within a time interval spanned by the legacy TDMA FN space multiplied by the modulo (mod) of the FN Extension field (e.g., the time interval spanned by the legacy TDMA FN space multiplied by 32 for the case of a 5-bit "FN Extension" field). This then allows the possibility of the nominal paging group used for the wireless device $104_1$, $104_2$, $104_3$ . . . $104_n$ to be unique to a TDMA frame that occurs less often than once per hyperframe and as infrequently as once per 32 hyperframes (i.e., using the example of a 5-bit "FN Extension" field). Basically, the wireless device $104_1$, $104_2$, $104_3$ . . . $104_n$ receives the SI message with the FN Extension information from the corresponding radio access network node $102_1$ and $102_2$. Then, the wireless device $104_1$, $104_2$, $104_3$ . . . $104_n$ may determine the precise location of any given TDMA frame within the legacy TDMA FN space multiplied by the multiplication factor indicated by the "FN Extension" field as discussed next.

First, the FCCH is a signal which generates a sharp frequency tone that the wireless device $104_1$, $104_2$, $104_3$ . . . $104_n$ receives and is able to synchronize against in time and frequency. Then, the SCH is the first channel the wireless device $104_1$, $104_2$, $104_3$ . . . $104_n$ decodes after the FCCH. The SCH contains the TDMA frame number information used by the wireless device $104_1$, $104_2$, $104_3$ . . . $104_n$ to determine where a TDMA frame will occur within the set of TDMA frames spanned by the legacy TDMA FN space. The content of an SCH burst includes T1, T2, and T3' (e.g., where T3' can be derived from T3) as follows:

- T1 (11 bits) range 0 to 2047=FN div (26×51). This field identifies a specific instance of 26 51-multiframes within the overall legacy FN space.
- T2 (5 bits) range 0 to 25=FN mod 26. This field identifies the specific 51-multiframe in a group of 26.
- T3' (3 bits) range 0 to 4=(T3−1) div 10. This field identifies the specific instance of an SCH burst within a 51-multiframe (i.e., 5 such bursts exist per 51-multiframe). A burst that a wireless device $104_1$, $104_2$, $104_3$ . . . $104_n$ (e.g., a mobile station (MS)) can successfully decode as an SCH burst occurs within TDMA frame 1, 11, 21, 31, or 41, which is what T3' identifies (e.g., T3'=2 indicates that the decoded SCH burst occurs in TDMA frame 21).
- T3 (6 bits) range 0 to 50=FN mod 51. This field identifies the specific TDMA frame within a 51-multiframe.

The SCH burst allows the wireless device $104_1$, $104_2$, $104_3$ . . . $104_n$ to determine precisely within which TDMA frames in the full TDMA FN space (i.e., modulo 2715648) multiplied by the multiplication factor indicated by the "FN Extension" that its nominal paging group (e.g., page) will occur. In particular, when the wireless device $104_1$, $104_2$, $104_3 \ldots 104_n$ reads the SCH it uses the information therein as follows to establish the current TDMA frame number: (1) T1 identifies the position of the GSM superframe within the hyperframe; (2) (T3−T2) mod 26 defines the position of the 51-multiframe within the T1 superframe; and (3) T3 finally determines the frame position within the 51-multiframe. Thereafter, the wireless device $104_1$, $104_2$, $104_3 \ldots 104_n$ receives and uses the FN Extension field to uniquely determine where any given TDMA frame occurs within a set of TDMA frames within a time interval spanned by the legacy TDMA FN space multiplied by the modulo of the FN Extension field (e.g., the time interval spanned by the legacy TDMA FN space multiplied by 32 for the case of a 5-bit "FN Extension" field).

Hence, with the wireless device $104_1$, $104_2$, $104_3 \ldots 104_n$'s ability to determine TDMA frame uniqueness over an extended time period (i.e., the time period spanned by the legacy TDMA FN space multiplied by the multiplication factor indicated by the "FN Extension") the wireless device $104_1$, $104_2$, $104_3 \ldots 104_n$ is also able to precisely determine the unique location(s) of its nominal paging group (e.g., page) occurring within that same extended time period. As such, if the wireless device $104_1$, $104_2$, $104_3 \ldots 104_n$'s extended DRX period has the same duration as the extended time period spanned by the legacy TDMA FN space multiplied by the multiplication factor indicated by the "FN Extension" then the wireless device $104_1$, $104_2$, $104_3 \ldots 104_n$'s nominal paging group (e.g., page) will occur only once during that extended time period. Alternatively, if the wireless device $104_1$, $104_2$, $104_3 \ldots 104_n$'s extended DRX period has ¼ the duration as the extended time period spanned by the legacy TDMA FN space multiplied by the multiplication factor indicated by the "FN Extension" then the wireless device $104_1$, $104_2$, $104_3 \ldots 104_n$'s nominal paging group will occur 4 times during that extended time period.

Solution 2

One or more of the timeslots within the Idle frame of a 51-multiframe can be transmitted by the radio access network node $102_1$ and $102_2$ as a Normal Burst (e.g., as described in the 3GPP Technical Specification (TS) 45.002 V12.1.0, entitled "Technical Specification Group GSM/EDGE Radio Access Network; Multiplexing and multiple access on the radio path (Release 12)"—the contents of which are incorporated by reference herein), wherein the FN Extension information will be present as part of the payload space. The reliable reception of FN Extension information will be possible as a result of the wireless device $104_1$, $104_2$, $104_3 \ldots 104_n$ reading as many instances of these Idle frame bursts as needed. The basic attributes of Idle frame bursts transmitted as Normal Bursts to convey the FN Extension information can be as follows:

Channel coding rate around ½
42 bits of payload space+16 bits CRC=58 bits
42 bits of payload space=FN Extension (5 bits)+Reserved (37 bits)

It is to be noted that the FN Extension field effectively serves as new most significant bits pre-pended to the legacy TDMA FN value, where a wireless device determines the legacy TDMA FN value as a result of reading information contained in an SCH burst. Alternatively, this FN Extension can be viewed as a new modulo $2^N$ hyperframe counter, as described in Solution 1 where the value of N is determined by the length of the FN Extension field (e.g., if N=5 then FN Extension field can be viewed as a new modulo $2^5=32$ hyperframes counter).

Solution 3

According to the 3GPP GERAN technical specifications, a burst may be transmitted with a random phase. The radio access network node $102_1$ and $102_2$ (e.g., base station $102_1$ and $102_2$) can hence use the transmission phase to convey information in the downlink to the wireless device $104_1$, $104_2$, $104_3 \ldots 104_n$ which is aware of this implementation, while this concept will be transparent to a legacy wireless device with no expectation on the phase. This general idea is covered by the super channel concept described in U.S. patent application Ser. No. 14/758,716, filed Jun. 30, 2015, entitled "Transmitter, Receiver and Methods Therein". The contents of this document are hereby incorporated by reference herein.

If the super channel is applied on, for example, TS0, then at most 51 bits of information can be conveyed per 51-multiframe. During a hyperframe, a total of 2048×26× 51=2715648 bits can be made available via the super channel. A subset of these bits can be used to signal the desired FN extension information. To optimize wireless device power savings (i.e., limit the time period over which FN Extension information is acquired), the FN extension information can preferably be conveyed over a single 51-multiframe, for example, the first 51-multiframe in a hyperframe, or potentially over each 51-multiframe in a hyperframe. In one example, the phase of only the FCCH and/or SCH bursts are used to convey up to 10 bits of information per 51-multiframe. The wireless device $104_1$, $104_2$, $104_3 \ldots 104_n$ may read these bursts when synchronizing to a cell and reading the Reduced Frame Number (also known as Reduced TDMA frame number (RFN) which is derived by reading the SCH), such that it will be convenient for the wireless device $104_1$, $104_2$, $104_3 \ldots 104_n$ to also derive the FN extension information from the phase information associated with these bursts.

In a scenario where extended coverage is needed in a GSM system, repeated transmission of SCH and FCCH may be needed, in which case the phase information will be repeated. However, as detection of the transmission phase is typically significantly more robust than reading the SCH and FCCH, the number of repetitions of the phase information may be reduced (i.e., less than the number of SCH/FCCH repetitions).

In another embodiment, using the super channel concept (e.g., as described in the aforementioned U.S. patent application Ser. No. 14/758,716), the phase information associated with a FCCH burst will allow each of the 5 instances of FCCH bursts per 51-multiframe to carry a single bit of information. These 5 super channel bits occurring in an even-numbered 51-multiframe combined with the 5 super channel bits occurring in the immediately following odd-numbered 51-multiframe can be combined to support a single 10-bit FN Extension field, which allows for a long DRX of up to about 148 days.

Figure 2:
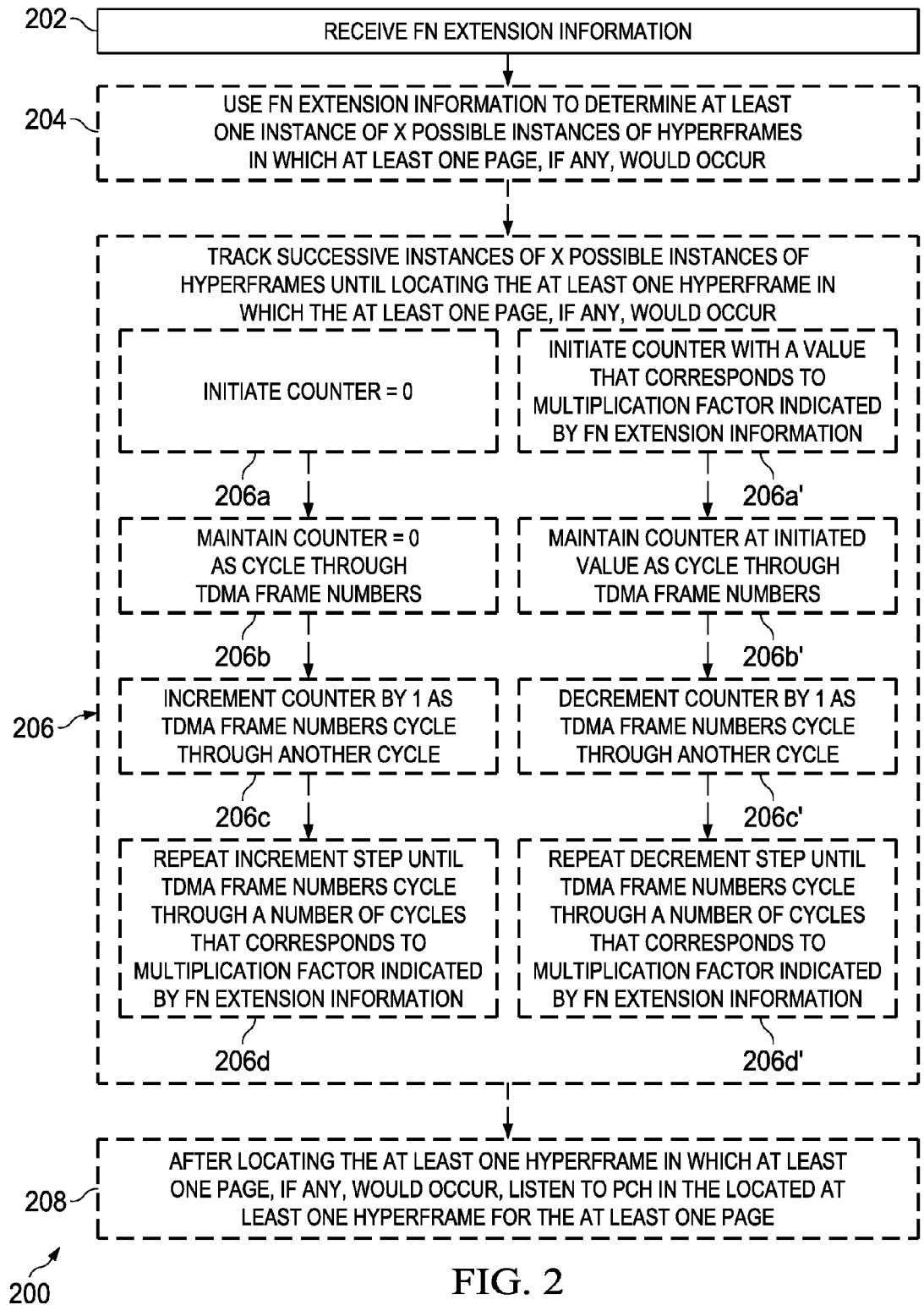
FIG. 2 is a flowchart of a method implemented in a wireless device in accordance with an embodiment of the present disclosure.

Basic Functionalities-Configurations of Wireless Device and Radio Access Network Node Referring to FIG. 2, there is a flowchart of a method 200 implemented in a wireless device $104_2$ (for example) in accordance with an embodiment of the present disclosure. At step 202, the wireless device $104_2$, receives from the radio access network node $102_2$, the FN Extension information 203 which indicates a multiplication factor for multiplying a time period spanned by a full cycle of TDMA frame numbers which comprises a single hyperframe (i.e., wherein TDMA FN numbers range from 0 to 2715647), as illustrated in FIG. 1. In one example, the FN extension information 203 is an N-bit field within a received SI message 205a (e.g., as discussed in the aforementioned solution 1). In another example, the FN extension information 203 is part of payload space within an idle frame received as a Normal Burst 205b (e.g., as discussed in the aforementioned solution 2). In yet another example, the FN extension information 203 is derived from phase information associated with received bursts 205c (e.g., as discussed in the aforementioned solution 3). At step 204, the wireless device $104_2$ uses the FN extension information 203 to determine at least one instance of X possible instances of hyperframes in which at least one page 209, if any, would occur (e.g., as discussed in the exemplary scenario below). At step 206, the wireless device $104_2$ tracks successive instances of the X possible instances of the hyperframes until it locates the at least one hyperframe in which the at least one page 209, if any, would occur. For example, the wireless device $104_2$ can perform the track step 206 by: (1) initiating a counter with a value 0 (step 206a); (2) maintaining the counter value at 0 as the TDMA frame numbers cycle through a first cycle of 0 to 2715647 (step 206b); (3) incrementing the counter value by 1 as the TDMA frame numbers cycle through another cycle of 0 to 2715647 (step 206c); and (4) repeat the incrementing step 206c until the TDMA frame numbers have cycled through a number of cycles of 0 to 2715647 that corresponds to the multiplication factor indicated by the FN extension information and then return to the initiating step 206a (step 206d). At step 208, the wireless device $104_2$ after locating the at least one hyperframe in which the at least one page 209, if any, would occur, listens to a paging channel (PCH) 207 in the located at least one hyperframe for the at least one page 209.

In other embodiments, the track step 206 can implement a counter that decrements down from the number of cycles of 0 to 2715647 that corresponds to the multiplication factor indicated by the FN extension information. That is, in these embodiments, the track step 206 could be performed by: (1) initiating a counter with a value that corresponds to the multiplication factor indicated by the FN extension information (step 206a'); (2) maintaining the counter value at that value as the TDMA frame numbers cycle through a first cycle of 0 to 2715647 (step 206b'); (3) decrementing the counter value by 1 as the TDMA frame numbers cycle through another cycle of 0 to 2715647 (step 206c'); and (4) repeat the decrementing step 206c' until the TDMA frame numbers have cycled through a number of cycles of 0 to 2715647 that corresponds to the multiplication factor indicated by the FN extension information (i.e., wherein the counter has a value of 0 during that last cycle) and then return to the initiating step 206a' (step 206d'). In still other embodiments, the counter is initiated to a given initial value and is changed (e.g., by a predetermined amount) with each subsequent cycle of TDMA frame numbers from 0 to 2715647 until a predetermined value is reached, wherein the counter would then return to the initial value. The other wireless devices $104_1$, $104_3$ ... $104_n$ can also be configured in a similar manner to perform method 200.

Figure 3:
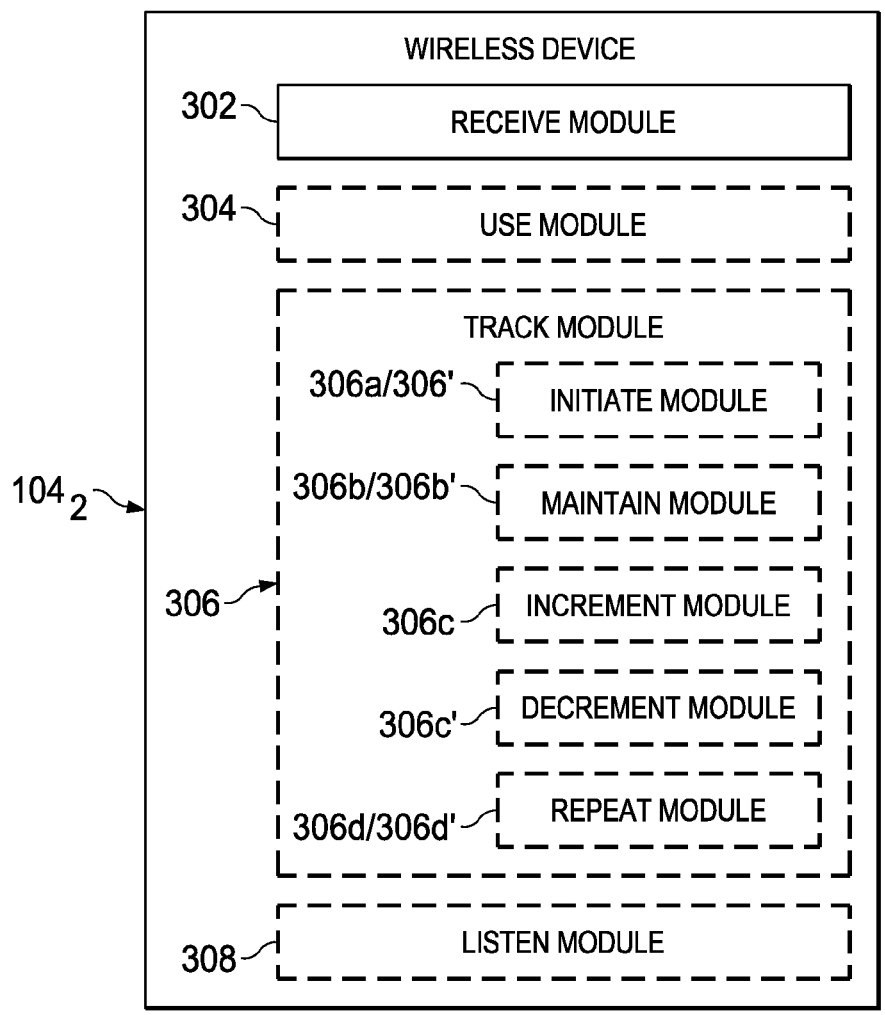
FIG. 3 is a block diagram illustrating structures of an exemplary wireless device configured in accordance with an embodiment of the present disclosure.

Referring to FIG. 3, there is a block diagram illustrating structures of an exemplary wireless device $104_2$ (for example) configured in accordance with an embodiment of the present disclosure. In one embodiment, the wireless device $104_2$ may comprise a receive module 302, a use module 304, a track module 306, and a listen module 308. The receive module 302 is configured to receive, from the radio access network node $102_2$, the FN Extension information 203 which indicates a multiplication factor for multiplying a time period spanned by a full cycle of TDMA frame numbers which comprises a single hyperframe (i.e., wherein TDMA FN numbers range from 0 to 2715647), as illustrated in FIG. 1. In one example, the FN extension information 203 is an N-bit field within a received SI message 205a (e.g., as discussed in the aforementioned solution 1). In another example, the FN extension information 203 is part of payload space within an idle frame received as a Normal Burst 205b (e.g., as discussed in the aforementioned solution 2). In yet another example, the FN extension information 203 is derived from phase information associated with received bursts 205c (e.g., as discussed in the aforementioned solution 3). The use module 304 is configured to use the FN extension information 203 to determine at least one instance of X possible instances of hyperframes in which at least one page 209, if any, would occur (e.g., as discussed in the exemplary scenario below). The track module 306 is configured to track successive instances of the X possible instances of the hyperframes until it locates the at least one hyperframe in which the at least one page 209, if any, would occur. For example, the track module 306 may comprise: (1) an initiate module 306a configured to initiate a counter with a value 0; (2) a maintain module 306b configured to maintain the counter value at 0 as the TDMA frame numbers cycle through a first cycle of 0 to 2715647; (3) an increment module 306c configured to increment the counter value by 1 as the TDMA frame numbers cycle through another cycle of 0 to 2715647; and (4) a repeat module 306d configured to repeat the incrementing operation until the TDMA frame numbers have cycled through a number of cycles of 0 to 2715647 that corresponds to the multiplication factor indicated by the FN extension information and then return to the initiate module 306a. After locating the at least one hyperframe in which the at least one page 209, if any, would occur, the listen module 308 is configured to listen to the paging channel (PCH) 207 in the located at least one hyperframe for the at least one page 209.

In other embodiments, the track module 306 is configured with a counter that decrements down from the number of cycles of 0 to 2715647 that corresponds to the multiplication factor indicated by the FN extension information. That is, in these embodiments, the track module 306 may comprise: (1) an initiate module 306a' configured to initiate a counter with a value that corresponds to the multiplication factor indicated by the FN extension information; (2) a maintain module 306b' configured to maintain the counter value at that value as the TDMA frame numbers cycle through a first cycle of 0 to 2715647; (3) a decrement module 306c' configured to decrement the counter value by 1 as the TDMA frame numbers cycle through another cycle of 0 to 2715647; and (4) a repeat module 306d' configured to repeat the decrementing operation until the TDMA frame numbers have cycled through a number of cycles of 0 to 2715647 that corresponds to the multiplication factor indicated by the FN extension information (i.e., wherein the counter has a value of 0 during that last cycle) and then return to the initiate module 306a'. In still other embodiments, the counter is initiated to a given initial value and is changed (e.g., by a predetermined amount) with each subsequent cycle of TDMA frame numbers from 0 to 2715647 until a predetermined value is reached, wherein the counter would then return to the initial value.

As those skilled in the art will appreciate, the above-described modules 302, 304, 306, 306a/306a', 306b/306b', 306c/306c', 306d/306d' and 308 of the wireless device $104_2$ (for example) may be implemented separately as suitable dedicated circuits. Further, the modules 302, 304, 306, 306a/306a', 306b/306b', 306c/306c', 306d/306d' and 308 can also be implemented using any number of dedicated circuits through functional combination or separation. In some embodiments, the modules 302, 304, 306, 306a/306a', 306b/306b', 306c/306c', 306d/306d' and 308 may be even combined in a single application specific integrated circuit (ASIC). As an alternative software-based implementation, the wireless device $104_2$ (for example) may comprise a memory $120_2$, a processor $118_2$ (including but not limited to a microprocessor, a microcontroller or a Digital Signal Processor (DSP), etc.) and a transceiver $110_2$. The memory $120_2$ stores machine-readable program code executable by the processor $118_2$ to cause the wireless device $104_2$ (for example) to perform the steps of the above-described method 200. It should be appreciated that the other wireless devices $104_1$, $104_3$ . . . $104_n$ can also be configured in a similar manner to perform method 200.

Figure 4:
FIG. 4 is a flowchart of a method implemented in a radio access network node in accordance with an embodiment of the present disclosure.

Referring to FIG. 4, there is a flowchart of a method 400 implemented in a radio access network node $102_2$ (for example) in accordance with an embodiment of the present disclosure. At step 402, the radio access network node $102_2$ transmits, to the wireless device $104_2$ (for example), the FN Extension information 203 which indicates a multiplication factor for multiplying a time period spanned by a full cycle of TDMA frame numbers which comprises a single hyperframe (i.e., wherein TDMA FN numbers range from 0 to 2715647), as illustrated in FIG. 1. In one example, the FN extension information 203 is an N-bit field within a transmitted SI message 205a (e.g., as discussed in the aforementioned solution 1). In another example, the FN extension information 203 is part of payload space within an idle frame transmitted as a Normal Burst 205b (e.g., as discussed in the aforementioned solution 2). In yet another example, the FN extension information 203 is derivable from (e.g., identified by) phase information associated with transmitted bursts 205c (e.g., as discussed in the aforementioned solution 3). The other radio access network node $102_2$ can also be configured in a similar manner to perform method 400.

Figure 5:
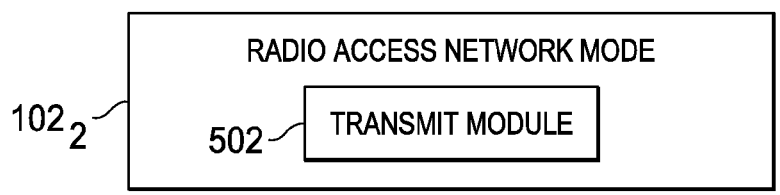
FIG. 5 is a block diagram illustrating a structure of an exemplary radio access network node configured in accordance with an embodiment of the present disclosure.

Referring to FIG. 5, there is a block diagram illustrating a structure of an exemplary radio access network node $102_2$ (for example) configured in accordance with an embodiment of the present disclosure. In one embodiment, the radio access network node $102_2$ may comprise a transmit module 502. The transmit module 502 is configured to transmit, to the wireless device $104_2$ (for example), the FN Extension information 203 which indicates a multiplication factor for multiplying a time period spanned by a full cycle of TDMA frame numbers which comprises a single hyperframe (i.e., wherein TDMA FN numbers range from 0 to 2715647), as illustrated in FIG. 1. In one example, the FN extension information 203 is an N-bit field within a transmitted SI message 205a (e.g., as discussed in the aforementioned solution 1). In another example, the FN extension information 203 is part of payload space within an idle frame transmitted as a Normal Burst 205b (e.g., as discussed in the aforementioned solution 2). In yet another example, the FN extension information 203 is derivable from (e.g., identified by) phase information associated with transmitted bursts 205c (e.g., as discussed in the aforementioned solution 3).

As those skilled in the art will appreciate, the above-described module 502 of the radio access network node $102_2$ (for example) may be implemented as a dedicated circuit. Further, the module 502 can also be implemented using any number of dedicated circuits through functional combination or separation. In some embodiments, the module 502 may be in a single application specific integrated circuit (ASIC). As an alternative software-based implementation, the radio access network node $102_2$ (for example) may comprise a memory $134_2$, a processor $132_2$ (including but not limited to a microprocessor, a microcontroller or a Digital Signal Processor (DSP), etc.) and a transceiver $122_2$. The memory $134_2$ stores machine-readable program code executable by the processor $132_2$ to cause the radio access network node $102_2$ (for example) to perform the step of the above-described method 400. It should be appreciated that the other radio access network node $102_1$ can also be configured in a similar manner to perform method 400.

Exemplary Scenario

The DRX cycle can be negotiated between the wireless device $104_2$ (for example) and a SGSN which is a component of the core network 106 as follows:

The wireless device $104_2$ enters a cell and acquires synchronization by decoding the FCCH and SCH. Then, the wireless device $104_2$ reads system information transmitted by the radio access network node $102_2$ thereby enabling the wireless device $104_2$ to acquire the FN Extension information 203 (e.g., as discussed in the aforementioned solution 1). It is to be noted that the wireless device $104_2$ can also acquire the FN Extension information 203 using one of the aforementioned solutions 2 and 3.

At this point, the wireless device $104_2$ knows the precise TDMA frame number information and the corresponding FN Extension information 203 (e.g., a value in the set {0, 1, 2 . . . 31}).

The wireless device $104_2$ selects a DRX cycle value from Table 1 (provided below) according to its preferred DRX cycle (periodicity of paging).

The wireless device $104_2$ indicates this desired DRX cycle value when registering with the SGSN (e.g., sending the SGSN a Routing Area Update request message, for example, as described in 3GPP TS 24.008 V12.7.0, entitled "Mobile radio interface Layer 3 specification; Core network protocols; Stage 3 (Release 12)"—the contents of which are incorporated herein by reference).

The actual DRX cycle value that the wireless device $104_2$ uses is negotiated in the sense that the SGSN is the master and indicates to the wireless device $104_2$ what actual DRX cycle to use (e.g., in the Routing Area Accept message). However, the requested value is typically accepted by the SGSN.

While the wireless device $104_2$ remains GPRS attached the SGSN sends corresponding paging request messages that include both the IMSI and the negotiated DRX cycle value for the wireless device $104_2$ to be paged thereby allowing the radio access network node $102_2$ (e.g., BSS $102_2$) to determine (e.g., calculate) when the next paging group occurs for that wireless device $104_2$.

The wireless device $104_2$ and the radio access network node $102_2$ (e.g., BSS $102_2$) each determine the specific PCH block comprising its nominal paging group (i.e., occurring once per DRX cycle) using a process such as, for example, the following:

PAGING GROUP(0 . . . $N-1$)=mod(IMSI,$N$)

where $N$=number of paging groups on one CCCH within a given DRX cycle="available" paging blocks per 51-multiframe*(Number of 51-multiframes per DRX Cycle)

For example, a wireless device 104₂ that has negotiated DRX cycle value="0100" (e.g., as illustrated in Table 1) will, while in a cell that supports 8 paging blocks per 51-multiframe, have a nominal paging group that occurs once in every 4 hyperframes (=once every 212992 51-multiframes).

In this case N=8*212992=1703936 (i.e., 1703936 paging groups per a DRX cycle comprising 4 hyperframes) and the wireless device specific PAGING_GROUP=mod (IMSI, 1703936).

TABLE 1

| DRX Cycle Value | DRX Cycle Length | Number of 51-multiframes per DRX Cycle | Hyperframes (HF) per DRX cycle |
|---|---|---|---|
| 0000 | ~52 minutes | 13312 | .25 (device listens for a page 4 times per HF) |
| 0001 | ~104 minutes | 26624 | .5 (device listens for a page 2 times per HF) |
| 0010 | ~208 minutes | 53248 | 1 (device listens for a page once per HF) |
| 0011 | ~416 minutes | 106496 | 2 (device listens for a page once every 2 HFs) |
| 0100 | ~832 minutes | 212992 | 4 (device listens for a page once every 4 HFs) |
| 0101 | 1664 minutes | 425984 | 8 (device listens for a page once every 8 HFs) |
| 0110 | 3328 minutes | 851968 | 16 (device listens for a page once every 16 HFs) |
| 0111 | 6656 minutes | 1703936 | 32 (device listens for a page once every 32 HFs) |

Note 1:
53248 51-multiframes occur with the TDMA FN space (2715648 TDMA frames)
Note 2:
All remaining DRX Cycle Values are reserved In view of the foregoing disclosure, one skilled in the art having access to the present disclosure would appreciate that the present disclosure provides a solution to the aforementioned need by enabling a wireless device interested in long DRX cycles (e.g., cycles substantially longer than 208 minutes) to establish and track a nominal paging group (page) that occurs less frequently than once per hyperframe and further enables the radio access network node (base station) to track exactly when that nominal paging group (page) will occur for that wireless device. To accomplish this, the FN Extension field 203 is introduced and can be seen as a multiplication factor which is used to multiply the time period spanned by a full cycle of the legacy TDMA FN values, and thereby allow wireless devices to make use of Long DRX cycles that are substantially greater than the 208 minutes and 53.76 seconds that is possible using the legacy TDMA FN space. It should be appreciated that the techniques of the present disclosure have many advantages such as, for example, substantially increasing the DRX cycle lengths (i.e., when compared to legacy operation), and therefore, enabling power savings to be realized by wireless devices.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless device configured to interact with a radio access network node, the wireless device comprising:
   a processor; and,
   a memory that stores processor-executable instructions, wherein the processor interfaces with the memory to execute the processor-executable instructions, whereby the wireless device is operable to:
      receive, from the radio access network node, a set of bursts conveying Frame Number (FN) Extension information which indicates a multiplication factor for multiplying a time period spanned by a full cycle of Time Division Multiple Access (TDMA) frame numbers which comprises a single hyperframe; and,
      derive the FN extension information from phase information associated with the received set of bursts,
   wherein the set of bursts are Synchronization Channel (SCH) bursts or Frequency Correction Channel (FCCH) bursts, and wherein the wireless device is operable in a Global System for Mobile Communications (GSM) system where extended coverage is needed and each set of the SCH bursts and the FCCH bursts is repeated a number of times to satisfy an extended coverage requirement while the phase information in the set of the SCH bursts and the FCCH bursts is acquired by the wireless device using less repetitions than the number of times each set of the SCH bursts and the FCCH bursts is repeated.

2. The wireless device of claim 1, wherein the wireless device is further operable to:
   use the FN extension information to determine at least one instance of X possible instances of hyperframes in which at least one page, if any, would occur;

track successive instances of the X possible instances of the hyperframes until the at least one hyperframe in which the at least one page, if any, would occur is located; and after the at least one hyperframe in which the at least one page, if any, would occur is located, listen to a paging channel in the located at least one hyperframe for the at least one page.

3. The wireless device of claim 2, wherein the wireless device, for the track operation, is further operable to:
initiate a counter with a value 0;
maintain the counter value at 0 as the TDMA frame numbers cycle through a first cycle of 0 to 2715647;
increment the counter value by 1 as the TDMA frame numbers cycle through another cycle of 0 to 2715647; and
repeat the increment operation until the TDMA frame numbers have cycled through a number of cycles of 0 to 2715647 that corresponds to the multiplication factor indicated by the FN extension information and then return to the initiate operation.

4. The wireless device of claim 1, wherein the set of bursts are Synchronization Channel (SCH) bursts or Frequency Correction Channel (FCCH) bursts, and wherein a phase of the SCH bursts or the FCCH bursts in the set are used to convey up to 10 bits of information indicating the FN Extension information per 51-multiframe.

5. The wireless device of claim 1, wherein the set of bursts used to provide the FN Extension information is conveyed over a single 51-multiframe in a hyperframe.

6. The wireless device of claim 1, wherein the set of bursts used to provide the FN Extension information is conveyed over each 51-multiframe in a hyperframe.

7. A method in a wireless device configured to interact with a radio access network node, the method comprising:
receiving, from the radio access network node, a set of bursts conveying Frame Number (FN) Extension information which indicates a multiplication factor for multiplying a time period spanned by a full cycle of Time Division Multiple Access (TDMA) frame numbers which comprises a single hyperframe; and,
deriving the FN extension information from phase information associated with the received set of bursts,
wherein the set of bursts are Synchronization Channel (SCH) bursts or Frequency Correction Channel (FCCH) bursts, and wherein the wireless device is operable in a Global System for Mobile Communications (GSM) system where extended coverage is needed and each set of the SCH bursts and the FCCH bursts is repeated a number of times to satisfy an extended coverage requirement while the phase information in the set of the SCH bursts and the FCCH bursts is acquired by the wireless device using less repetitions than the number of times each set of the SCH bursts and the FCCH bursts is repeated.

8. The method of claim 7, further comprising:
using the FN extension information to determine at least one instance of X possible instances of hyperframes in which at least one page, if any, would occur;
tracking successive instances of the X possible instances of the hyperframes until the at least one hyperframe in which the at least one page, if any, would occur is located; and
after the at least one hyperframe in which the at least one page, if any, would occur is located, listening to a paging channel in the located at least one hyperframe for the at least one page.

9. The method of claim 8, wherein the tracking step further comprises:
initiating a counter with a value 0;
maintaining the counter value at 0 as the TDMA frame numbers cycle through a first cycle of 0 to 2715647;
incrementing the counter value by 1 as the TDMA frame numbers cycle through another cycle of 0 to 2715647; and
repeating the increment operation until the TDMA frame numbers have cycled through a number of cycles of 0 to 2715647 that corresponds to the multiplication factor indicated by the FN extension information and then return to the initiating step.

10. The method of claim 7, wherein the set of bursts are Synchronization Channel (SCH) bursts or Frequency Correction Channel (FCCH) bursts, and wherein a phase of the SCH bursts or the FCCH bursts in the set are used to convey up to 10 bits of information indicating the FN Extension information per 51-multiframe.

11. The method of claim 7, wherein the set of bursts used to provide the FN Extension information is conveyed over a single 51-multiframe in a hyperframe.

12. The method of claim 7, wherein the set of bursts used to provide the FN Extension information is conveyed over each 51-multiframe in a hyperframe.

13. A radio access network node configured to interact with a wireless device, the radio access network node comprising:
a processor; and,
a memory that stores processor-executable instructions, wherein the processor interfaces with the memory to execute the processor-executable instructions, whereby the radio access network node is operable to:
generate a set of bursts to convey Frame Number (FN) Extension information which indicates a multiplication factor for multiplying a time period spanned by a full cycle of Time Division Multiple Access (TDMA) frame numbers which comprises a single hyperframe; and,
transmit, to the wireless device, the set of bursts where transmission phases of the bursts in the set are used to convey the FN Extension information,
wherein the set of bursts are Synchronization Channel (SCH) bursts or Frequency Correction Channel (FCCH) bursts, and wherein the radio access network is operable in a Global System for Mobile Communications (GSM) system where extended coverage is needed and each set of the SCH bursts and the FCCH bursts is repeated a number of times to satisfy an extended coverage requirement while the phase information in the set of the SCH bursts and the FCCH bursts is acquired by the wireless device using less repetitions than the number of times each set of the SCH bursts and the FCCH bursts is repeated.

14. The radio access network node of claim 13, wherein the set of bursts are Synchronization Channel (SCH) bursts or Frequency Correction Channel (FCCH) bursts, and wherein a phase of the SCH bursts or the FCCH bursts in the set are used to convey up to 10 bits of information indicating the FN Extension information per 51-multiframe.

15. The radio access network node of claim 13, wherein the set of bursts used to provide the FN Extension information is conveyed over a single 51-multiframe in a hyperframe.

16. The radio access network node of claim 13, wherein the set of bursts used to provide the FN Extension information is conveyed over each 51-multiframe in a hyperframe.

17. A method in a radio access network node configured to interact with a wireless device, the method comprising:
generating a set of bursts to convey Frame Number (FN) Extension information which indicates a multiplication factor for multiplying a time period spanned by a full cycle of Time Division Multiple Access (TDMA) frame numbers which comprises a single hyperframe; and,
transmitting, to the wireless device, the set of bursts where transmission phases of the bursts in the set are used to convey the FN Extension information,
wherein the set of bursts are Synchronization Channel (SCH) bursts or Frequency Correction Channel (FCCH) bursts, and wherein the radio access network is operable in a Global System for Mobile Communications (GSM) system where extended coverage is needed and each set of the SCH bursts and the FCCH bursts is repeated a number of times to satisfy an extended coverage requirement while the phase information in the set of the SCH bursts and the FCCH bursts is acquired by the wireless device using less repetitions than the number of times each set of the SCH bursts and the FCCH bursts is repeated.

18. The method of claim 17, wherein the set of bursts are Synchronization Channel (SCH) bursts or Frequency Correction Channel (FCCH) bursts, and wherein a phase of the SCH bursts or the FCCH bursts in the set are used to convey up to 10 bits of information indicating the FN Extension information per 51-m ultiframe.

19. The method of claim 17, wherein the set of bursts used to provide the FN Extension information is conveyed over a single 51-multiframe in a hyperframe.

20. The method of claim 17, wherein the set of bursts used to provide the FN Extension information is conveyed over each 51-multiframe in a hyperframe.

\* \* \* \* \*